Patented Dec. 24, 1940

2,226,057

UNITED STATES PATENT OFFICE 2,226,057

PROCESS FOR DEHYDROGENATING HETEROCYCLIC BASES

Charles Graenacher, Riehen, and Jules Meyer, Basel, Switzerland, assignors to the firm Society of Chemical Industry in Basle, Basel, Switzerland No Drawing. Application June 1, 1939, Serial No. 276,870. In Switzerland June 20, 1936

1 Claim. (Cl. 260—309)

It has not hitherto been known that heterocyclic bases which contain in the same ring at least two nitrogen atoms, such as the bases of the group of the imidazolines and the hydropyrimidines, can be dehydrogenated by treatment at a raised temperature with dehydrogenating catalysts. This invention relates to the dehydrogenation of such bases under the conditions indicated above and with very good yield, whereby on the one hand a series of known products becomes easily accessible and on the other hand new compounds otherwise scarcely accessible are obtained.

Among the products which may be subjected to the new treatment are in the first place simple imidazolines, such as 2-methyl-, 2-ethoxymethyl-imidazoline; especially valuable and new imidazols are obtained from imidazolines containing at least one aliphatic chain consisting of at least 7 carbon atoms, for instance an alkyl radical, such as 2-octyl-, 2-decyl-, 2-undecyl-, 2-heptadecenyl or 2-heptadecyl-imidazoline; also products such as those which are obtainable as described in British Patent No. 460,528 or United States Patent application Serial No. 33,911, filed July 30, 1935, for instance 2-cyanomethyl-imidazoline, 2-benzyl-imidazoline, 2-hydroxyphenyl-imidazoline, 2-[γ-(2'-methoxy-6'-allylphenoxy)-propyl]-imidazoline, the 8-quinoline ether of 2-methylol-imidazoline, 2-(3':4':5'-trimethoxybenzyl)-imidazoline or the 2-phenyl-5-methyl-imidazoline. Further, other imidazolines which correspond with the definition given above, such as those which are derived from carboxylic acids other than those indicated, for instance heterocyclic carboxylic acids and from other 1:2-alkylene diamines, for example those of the general formula

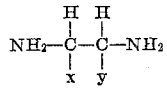

in which, for instance, $x$ represents an alkyl residue with more than 2 carbon atoms or an aralkyl or aryl residue and $y$ represents a hydrogen atom or in which $x$ and $y$ are the same or different alkyl, aralkyl or aryl residues. These imidazolines are converted by the process of the invention into the corresponding imidazoles. Also other heterocyclic bases of the kind indicated above, for instance hydro-pyrimidine derivatives, may be dehydrogenated to the corresponding pyrimidines.

As dehydrogenating agents there may be used quite generally dehydrogenating catalysts. The operation with the latter is of special interest. One may proceed at ordinary pressure or under diminished pressure, if desired in the presence of a dispersing agent or a diluent and a hydrogen acceptor, for instance cyclohexanone, naphthalene or cinnamic acid ester. When the action is finished the dehydrogenation product may be isolated from the mass, for example by fractional distillation; it may also be separated by decantation or filtration, if desired with the addition of a suitable solvent, from the catalyst and then worked up either immediately or by evaporation or crystallization of the solution to obtain the pure form. This new mode of operation is very simple; it involves the advantage that very pure products are obtained. Suitable dehydrogenation catalysts are the products known for this purpose, such as finely subdivided noble or non-noble metals of the iron, copper and platinum groups, such as finely subdivided nickel, iron, platinum, palladium, copper or silver.

The reaction is carried out at higher temperatures. By the term higher temperatures there are to be understood temperatures that lie above 150° C., preferably such between 150 and 250° C. If necessary one may operate at still higher temperatures, for instance 280° C.

The products obtainable according to the present process may be used for the most varied purposes. Thus the imidazoles or pyrimidines of low molecular weight may be used for the preparation of medicaments or intermediate products thereof, whereas those of high molecular weight, for example products containing at least one aliphatic chain consisting of at least 6 carbon atoms for instance the imidazoles of the general formula

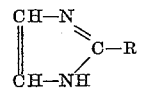

wherein R stands for an aliphatic chain consisting of at least 7 carbon atoms, for instance

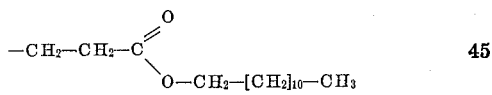

or of an alkyl radical such as —$CH_2$—[$CH_2$]$_6CH_3$, —$CH_2$—[$CH_2$]$_{10}$—$CH_3$, are distinguished by the strong capillary-active properties of their dilute aqueous solutions or of the dilute aqueous solutions of their salts and derivatives, such as sulfonic acids. Such products may therefore be used in all processes of the textile industry or textile improving industry as wetting, washing, cleaning, levelling, emulsifying, softening or water-resisting agents.

The following examples illustrate the invention, the parts being by weight:

*Example 1*

50 parts of crude 2-undecyl-imidazoline are heated while stirring at 170–220° C. with 5 parts of nickel catalyst. At 170° C. a lively evolution of hydrogen occurs. After 1½ hours the product is distilled from the catalyst directly under 15 mm. pressure. There is obtained in good yield a colorless distillate which solidifies to a crystalline mass. After several recrystallizations from methyl alcohol and a little water the 2-undecyl-imidazole thus obtained forms colorless crystals which melt at 73–74° C. and are soluble in dilute hydrazides to form foaming solutions. The 2-undecyl-imidazole corresponds to the formula

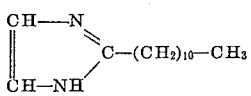

*Example 2*

50 parts of 2-heptadecyl-imidazoline are heated while stirring at 185–240° C. with 5 parts of nickel catalyst. At about 210° C. a lively evolution of hydrogen occurs. After about 1½ hours the product is distilled directly under 15 mm. pressure. There is obtained in good yield a colorless distillate which solidifies to a crystalline mass. After several recrystallizations from methyl alcohol 2-heptadecyl-imidazole is obtained in a beautiful crystalline form; it melts at 83–84° C. and dissolves with formation of foam in dilute hydrochloric acid. It corresponds to the formula

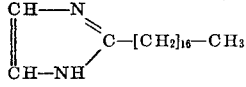

*Example 3*

60 parts of heptadecylene-imidazoline are heated with 15 parts of nickel catalyst as indicated in Example 2. At about 170° C. a feeble evolution of hydrogen can be observed and at 200–210° C. a vigorous elimination of hydrogen sets in. In about 3 hours the evolution of gas is finished after the whole has been heated at the end to 245° C.

The reaction product is directly distilled over the nickel at a pressure of 12 mm. The boiling point of the white somewhat soft, semi-crystalline mass lies at about 270° C. The new product of the formula

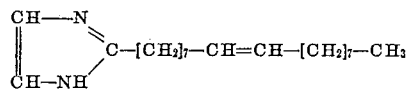

is taken up by dilute hydrohalic acids to form foaming solutions.

*Example 4*

50 kilos of cotton yarn are dyed with 1.5 kilos of Chloranthine Red 8BN (color index No. 436) in 1000 litres of water containing 0.5 kilo of crystallized sodium carbonate and 15 kilos of crystallized sodium sulfate, for 1 hour at the boil; the goods are then rinsed and treated in a bath consisting of 1000 liters of water and 0.5 kilo of the hydrochloride of the product of Example 2. The dyeing thus obtained is excellently fast to water.

This application is a continuation-in-part of our application Serial No. 148,242, filed June 14, 1937.

What we claim is:

The 2-heptadecenyl-imidazole of the formula

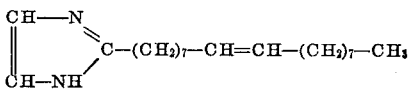

which is a soft semicrystalline mass soluble in dilute hydrohalic acids to form foaming solutions.

CHARLES GRAENACHER.
JULES MEYER.